Figure 1:
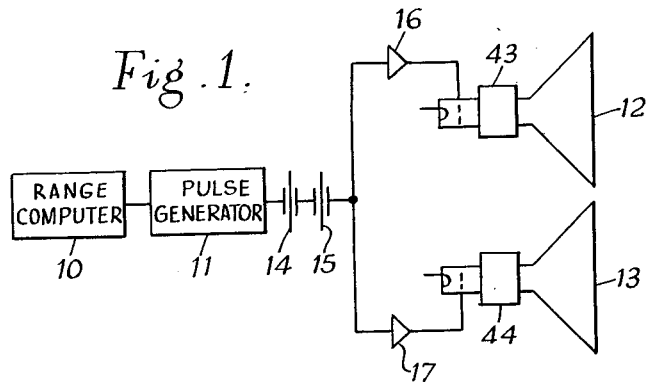

April 4, 1961    C. E. G. BAILEY ET AL    2,977,687
RADAR SIMULATORS
Filed Oct. 25, 1956    4 Sheets-Sheet 1

INVENTORS
Christopher E. G. Bailey
Leslie J. Kennard
BY
Ralph B. Stewart
ATTORNEY

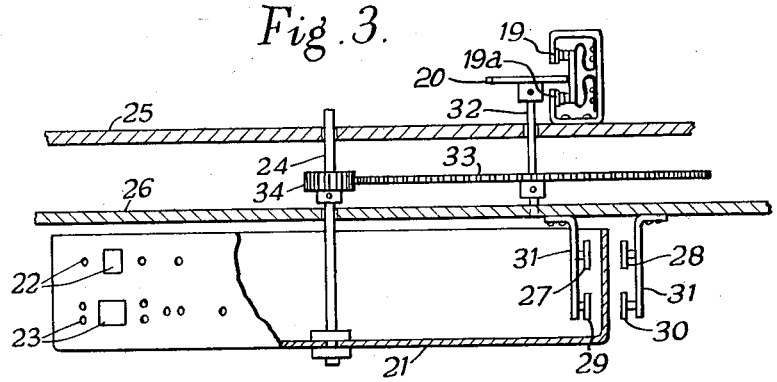
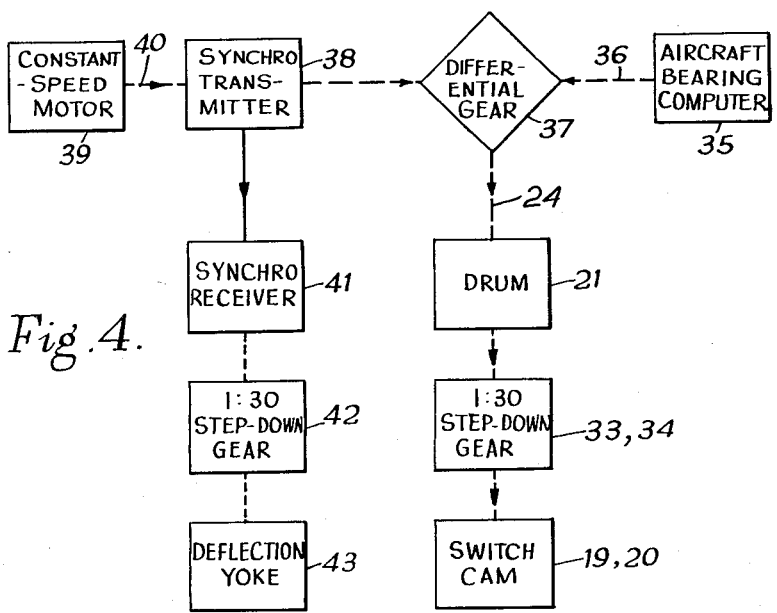

INVENTORS
Christopher E. G. Bailey
Leslie J. Kennard
BY
Ralph B. Stewart
ATTORNEY ized Patent Office
2,977,687
Patented Apr. 4, 1961

2,977,687
RADAR SIMULATORS
Christopher E. G. Bailey, London, and Leslie J. Kennard, Guildford, England, assignors to The Solartron Electronic Group Limited, Surrey, England
Filed Oct. 25, 1956, Ser. No. 618,293
Claims priority, application Great Britain Nov. 2, 1955
11 Claims. (Cl. 35—10.4)

The present invention relates to radar simulators by means of which there can be produced upon a viewing screen, with the aid of synthetically generated signals, a presentation substantially identical with that produced in a radar system by echo signals from objects reflecting the radar waves and/or by jamming signals.

Radar simulators as hitherto constructed have been capable of simulating only certain well-defined and limited situations. In particular radar aerials of different types have different three-dimensional radiation characteristics which give rise to correspondingly different effects in the presentation. Known simulators have been capable of representing the effects of only one assumed set of aerial characteristics.

It is the principal object of the present invention to provide a simulator which can readily be made adjustable to produce presentations corresponding to a wide range of different aerial characteristics.

The invention is based upon the discovery that a sufficiently accurate simulation of the characteristics of any one aerial can be obtained by multiplying the characteristic of the aerial in the horizontal plane at the maximum in the vertical plane by the characteristic in the vertical plane at the maximum in the horizontal plane.

Thus, according to the present invention, a radar simulator comprises a signal generator arranged to pass signals to at least one display device through two attenuators coupled in cascade and adapted to be varied in accordance with the movements in the horizontal and vertical planes respectively of an aerial to be simulated, one of the attenuators being adapted during the said movement thereof to vary the attenuation in such a manner as to simulate the characteristic of the aerial in the horizontal plane at the maximum in the vertical plane and the other attenuator being adapted during the said movement thereof to vary the attenuation in such a manner as to simulate the characteristic of the aerial in the vertical plane at the maximum in the horizontal plane.

According to a feature of the invention, each attenuator comprises a conducting sheet adapted to be moved in order to effect the said variation in attenuation and arranged as an electrostatic screen between an input and an output electrode, the sheet being pierced with holes whose size and disposition determine the degree of coupling between the said electrodes. The conducting sheets are conveniently in the form of discs or drums rotatable about an axis.

The characteristics of the aerial simulated can be made readily variable by making the conducting sheet readily detachable so that it may be exchanged for another having holes of different sizes or dispositions or both.

According to another feature of the invention each conducting sheet is provided with a plurality of rows of holes, each row co-operating with a different input and/or output electrode. For example one row of holes may be designed to simulate radar echoes and passive jamming (that is to say echoes received from artificial reflectors) the signals of which, in actual radar equipment, result from a double traversal of the aerial, and another row of holes may be designed to simulate active jamming (that is jamming signals transmitted by a jamming transmitter) the signals of which, in actual radar equipment, result from only one traversal of the aerial.

Means may be provided for switching and/or controlling the relative amplitudes of the signals from the different electrode systems of the attenuators.

It is a requirement in a tactical radar simulator to be able to simulate passive jamming, i.e. artificial reflectors known as "window." This consists of bundles of narrow strips of metal foil, constituting dipoles, which are jettisoned from an aircraft. The strips disperse radially as they fall and when viewed from a ground radar with P.P.I. presentation the azimuth arc that one bundle of "window" covers when it is fully dispersed may be quite large, especially if the "window" is dropped near to the radar installation.

A further and subsidiary object of the present invention is to provide means whereby the effect of this dispersion of "window" can be simulated.

According to a subsidiary feature of the invention each attenuator comprises a conducting sheet arranged as an electrostatic screen adapted to be moved between an input and an output electrode and pierced with at least one hole, and means for varying the size of the hole. Means may be provided for sweeping the hole repeatedly over the space between the electrodes and for progressively increasing the size of the hole in successive traversals of the space.

Figure 2:
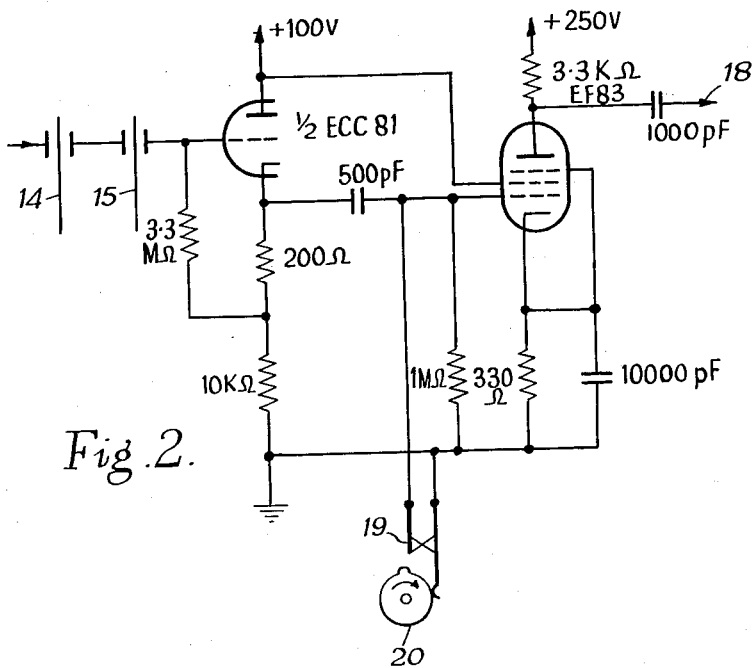
Figure 5:
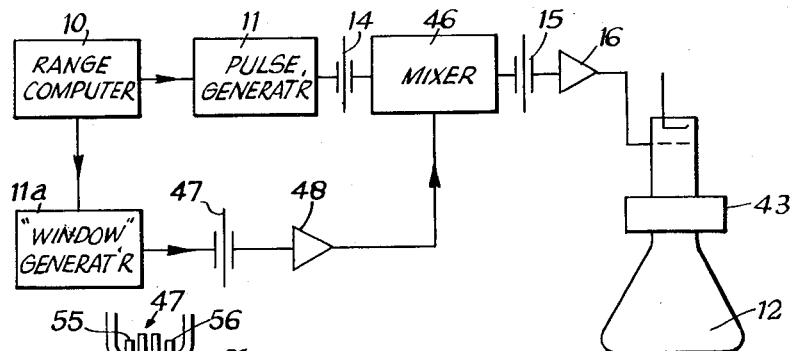

The invention will be described, by way of example, with reference to the accompanying drawings in which Fig. 1 is a much simplified diagram of a radar simulator embodying the present invention, Fig. 2 shows one form that the amplifiers in Fig. 1 may take, Fig. 3 shows one form that the attenuators in Fig. 1 may take, Fig. 4 is a block circuit diagram showing one way in which the attenuators of Fig. 1 may be driven, Fig. 5 is a block circuit diagram of a further embodiment of the invention including means for simulating "window,"

Figure 6:
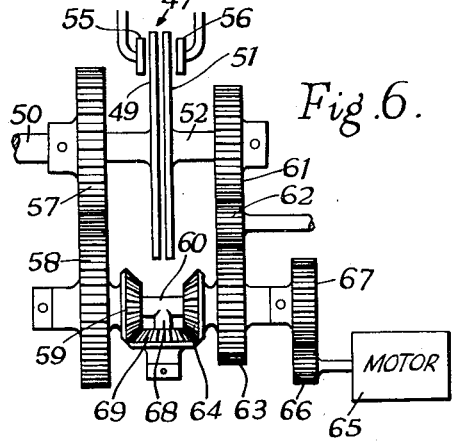
Figure 7:
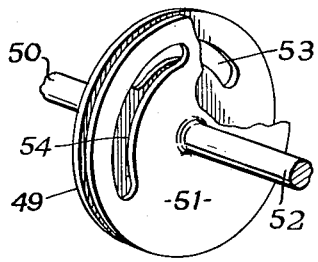
Figure 8:
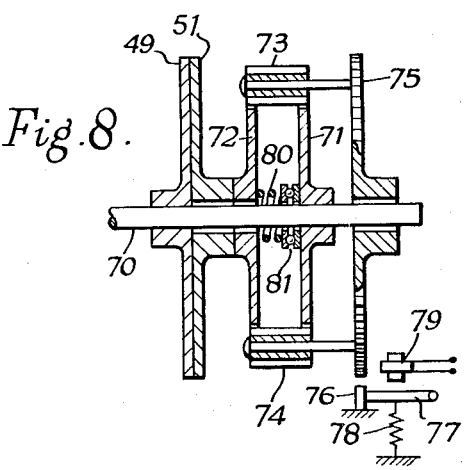
Figure 9:
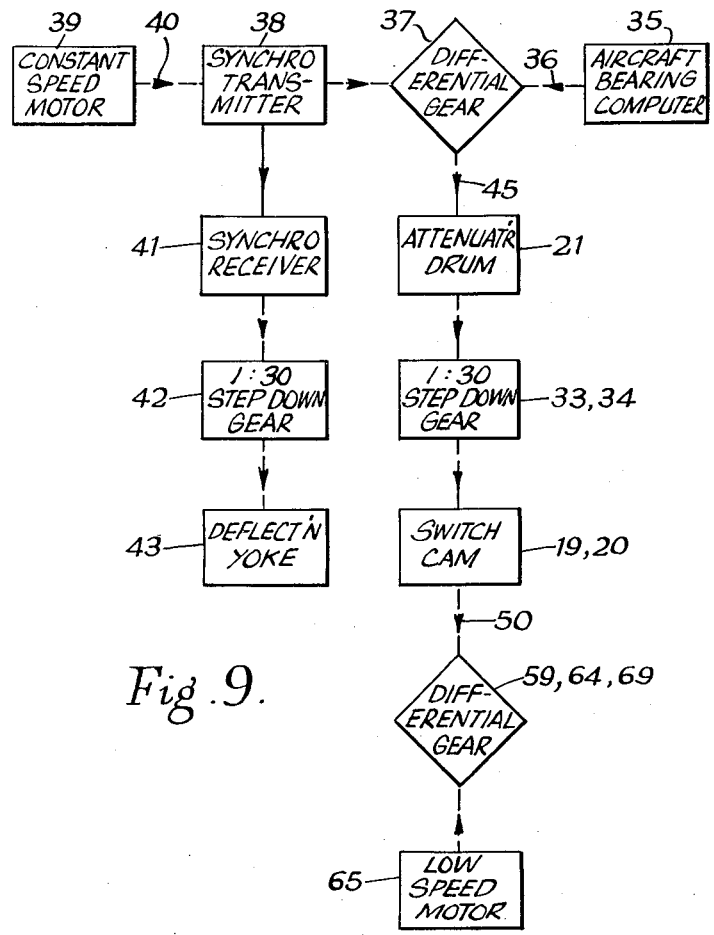

Fig. 6 is a view showing one form that the "window" attenuator of Fig. 5 may take, Fig. 7 is a perspective view of the discs of the attenuator in Fig. 6, Fig. 8 shows an alternative form that the "window" attenuator of Fig. 5 may take, and Fig. 9 is a block circuit diagram showing one way in which the "window" attenuator of Figs. 6 or 8 may be driven.

Referring first to Fig. 1, a range computer 10 is arranged to control a pulse generator 11 in such a manner as to generate triggering pulses corresponding to assumed times of transmission of radar signals and echo pulses simulating radar pulses received as echoes from one or more reflecting objects, the computer determining the time relation between triggering pulses which serve to trigger the radial time bases (not shown) of two P.P.I. tubes 12 and 13 and the echo pulses, and thus the range of the object or objects. The pulses from the generator 11 are applied through two attenuators 14 and 15 in cascade to the inputs of two amplifiers 16 and 17. The outputs of the amplifiers are connected to the control grids of the tubes 12 and 13 respectively in such a manner that the pulses intensify the cathode ray beams in these tubes.

The amplifiers 16 and 17 are alike and the circuit of one is shown in Fig. 2. The output terminal 18 is connected to the grid of the tube 12 in Fig. 1. A switch 19 operated by a cam 20 serves to render the amplifier operative and inoperative for a purpose that will be explained later.

The attenuators 14 and 15 in Fig. 1 may each be of the form shown in Fig. 3. A metal drum 21 perforated with two rows of holes 22 and 23 is mounted for rotation on a shaft 24 journalled in mounting plates 25 and 26. The holes 22 co-operate with an input electrode 27 and an output electrode 28, while the holes 23 co-operate with an input electrode 29 and an output electrode 30. These electrodes are all insulated from one another and are mounted upon the plate 26 by means of brackets 31. The metal of the drum 21 serves as an electrostatic screen between electrode 27, 28 and 29, 30 excepting where there are holes, where the screening is reduced in proportion to the size of the holes. The holes, as they move between the electrodes, serve to vary the coupling between the electrodes and their sizes and spacing are chosen in such a manner as to produce the requisite changes in attenuation. The electrodes 27 and 28 may for example be the input and output electrodes of one of the attenuators 14 or 15 in Fig. 1 and the electrodes 29 and 30 may be arranged in a circuit between a suitable source of active jamming signals and the grid of one or both of the tubes 12 and 13 in Fig. 1, suitable means being provided for controlling the level of the jamming signals introduced. Such active jamming signals may consist of random noise, a suitable source of such signals being a noise generator such as a gas discharge tube arranged in known circuit.

When a narrow beam aerial is to be simulated, if the drum 21 were rotated at the same speed as the aerial, the holes would have to be spaced inconveniently close together and the electrodes would have to be so narrow that the changes in coupling produced by movement of the drum would be very small. The drum is accordingly arranged to rotate at a multiple $n$ of the aerial speed and the signals are arranged to be operative during only one revolution of the drum in every $n$ revolutions thereof.

Referring again to Fig. 3, a shaft 32 is driven at aerial speed and is coupled to the shaft 24 by a 30:1 gear 33, 34 so that the drum 21 is driven at 30 times the speed of the shaft 32. On the latter shaft is mounted the cam 20 (show also in Fig. 2) operating switches 19 and 19a, the switch 19 being associated with the amplifier 16 (say) in Fig. 1 and the switch 19a, being associated with the jammer circuit containing the electrodes 29 and 30. The cam 20 is shaped somewhat as shown in Fig. 2 so that the amplifier of Fig. 2 is operative only during 1/30 of each revolution of the cam.

Fig. 4 shows how the drum of one of the attenuators 14, 15 in Fig. 1 may be driven, the drum being that associated with an aircraft bearing computer 35 which produces rotations of its shaft 36 in dependence upon assumed changes in bearing of an aircraft. In Fig. 4 mechanical drives are represented by broken lines and electrical connections by full lines. A differential gear 37 has one input shaft connected to the shaft 36 and the other input shaft connected through a synchro transmitter 38 to a constant speed motor 39 whose shaft 40 is rotated at thirty times the assumed speed of rotation in azimuth of the aerial to be simulated. The output shaft 24 of the differential gear 37 drives the drum 21 and its associated gearing 33, 34 and cam switch 19, 20.

A synchro receiver 41, generally located remote from the transmitter 38, is connected to the transmitter 38 and thereby driven in step with the transmitter. The receiver 41 is connected through a 1:30 step-down gear 42 to a deflection yoke 43 of the cathode ray tube (say 12) in Fig. 1.

Assuming that the drum 21 in Fig. 4 represents the drum of the attenuator 14 in Fig. 1, a similar arrangement to that shown in Fig. 4 is provided for driving the drum of the attenuator 15 in Fig. 1. The shaft 40 is driven in accordance with the elevation scan of the aerial and the bearing computer 35 in Fig. 4 is replaced by an elevation computer. The yoke 43 in Fig. 4 is replaced by a yoke 44 of the cathode ray tube 13 in Fig. 1.

Suitable dimensions for the attenuator shown in Fig. 3 are a drum of 0.04 inch thick aluminium, 6 inches diameter and 1½ inches axial length, electrodes ½ inch in a direction parallel to the drum axis by ¼ inch at right angles to the drum axis, and as electrode to drum spacing of 0.05 inch.

Referring now to Fig. 5, the parts 10, 11, 14, 15, 16 and 12 operate in the manner already described with reference to Fig. 1 excepting that a mixer 46 is interposed between the attenuators 14 and 15.

A "window" pulse generator 11a is arranged to be triggered by the range computer 10 and to generate pulses simulating those received from passive jamming, the triggering taking place in appropriate time relation to the time base sweep of the tube 12, and hence at the appropriate range. Such pulses preferably are longer than those representing radar echoes from a single target and are modulated in known manner by random noise. These pulses are applied through a "window" attenuator 47 and an amplifier 48 to the mixer 46 where they are mixed with the normal echo signals from the attenuator 14.

Figs. 6 and 7 show one form that the attenuator 47 of Fig. 5 may take. A disc 49 is rotatable on a shaft 50 and a second disc 51 of the same radius and thickness is rotatable on a shaft 52. These discs are provided with slots 53 and 54, as shown in Fig. 7, and two electrodes 55 and 56 are arranged on either side of the discs opposite the path followed by the slots when the discs are rotated.

The shaft 50 is driven in a manner that will be described later with reference to Fig. 9 at a speed proportional to the difference between the scanning speed of the aerial and the change of bearing of the target, and carries a toothed wheel 57 meshing with a toothed wheel 58 having fixed thereto a bevel pinion 59 and rotatable on a shaft 60. The shaft 52 carries a toothed wheel 61 coupled by an idler wheel 62 with a second toothed wheel 63 having a bevel pinion 64 fixed thereto, both being rotatable on the shaft 60. The shaft 60 is rotated by a motor 65 through gearing 66, 67, and carries a stub shaft 68 on which a planet wheel 69 is rotatably mounted, the planet meshing with the bevel pinions 59 and 64. The electrode 55 is coupled to the output of the "window" generator 11a in Fig. 5 and the electrode 56 is coupled to the input of the amplifier 48.

In operation, the shaft 50 is rotated at a uniform speed and the discs 49 and 51 are thereby rotated at the same speed and in the same direction. Assume that, initially, the motor 65 is at rest, so that the shaft 60 is stationary, and that the discs 49 and 51 are so placed that their slots 53 and 54 are diametrically opposed, that is to say there is no overlap between them. There is then no coupling through the attenuator 47. When "window" is required to be simulated the motor 65 is energised and the rotation of the planet wheel 69 around the axis of the shaft 60 causes the disc 51 to rotate slower or faster than the disc 49, according to the direction of rotation of the shaft 60. This direction of rotation is immaterial and the motor 65 need not be reversible. The effect of the differential movement of the discs 49 and 51 is to cause the slots 53 and 54 to begin to overlap, thereby producing coupling between the "window" generator 11a and the amplifier 48 over a small angle of rotation of the discs. If the motor 65 is kept running, the the overlap of the slots increases and so the angle of rotation over which coupling is produced is correspondingly increased. "Window" signals are, therefore, passed to the display device 12 during an increasing fraction of each rotation of the discs, thus simulating "window" increasingly dispersed.

Fig. 8 shows an alternative way of driving the discs 49 and 51. The disc 49 is fast on a shaft 70 which carries a toothed wheel 71. The other disc 51 and another toothed wheel 72 fixed thereto are rotatable on the shaft 70. The toothed wheels 71 and 72 form parts of an odd-tooth epicyclic gear which includes planet gears 73 and 74 meshing with the wheels 71 and 72 and rotatable on spindles fixed to a disc 75 constituting a planet carrier. The disc 75 is freely rotatable on the shaft 70 and is provided at its edge with ratchet teeth adapted to be engaged by a pawl 76 which is mounted on a pivoted lever 77 and urged by a spring 78 out of engagement with the teeth of the disc 75. The pawl 76 can be engaged, when required, by energising an electro-magnet 79. A spring 80 is located between a thrust bearing 81 on the wheel 71 and the wheel 72 and thereby presses the two discs 49 and 51 into frictional engagement with one another. The discs 49 and 51 are provided with slots 53 and 54 as shown in Fig. 7.

With the pawl 76 disengaged, the shaft 70, driven in the same way as the shaft 50 in Fig. 6, will rotate the disc 49, and the disc 51 being in frictional engagement with the disc 49 will rotate at the same speed as the disc 49. The disc 75 will be rotated at the same speed as the discs 49 and 51. When the electro-magnet 79 is energised, the pawl 76 engages a tooth of the disc 75 and arrests the rotation of this disc. The two wheels 72 and 71 will then rotate at slightly different speeds dependent upon the ratio of the numbers of teeth on the wheels 71 and 72 and thus the two discs 49 and 51 will rotate relatively to one another thereby causing the slots therein to overlap, the degree of overlap increasing progressively so long as the electromagnet remains energised.

Fig. 9 shows how the shaft 50 of Fig. 6 may be driven. All the parts in this figure including and above the parts 19, 20 and 43 operate as described with reference to Fig. 4. All electrical connections are shown in full lines and mechanical connections in broken lines. The attenuator drum 21 is the movable element in the attenuator 14 in Fig. 5. Thus it is seen that the shaft 50 in this example is an extension of the shaft driving the switch cam 19, 20.

The circuit shown is that associated with the bearing computer 35. A like circuit arrangement is provided for elevation, the bearing computer 35 being replaced by an elevation computer, the attenuator drum 21 being that of the attenuator 15 in Fig. 5 and the deflection yoke 43 being replaced by the deflection yoke of a further P.P.I. tube having its grid effectively in parallel with that of the tube 12 as described with reference to Fig. 1.

We claim:

1. A radar simulator comprising signal generating means, at least one display device, means coupling said generating means to said display device, two signal attenuators coupled in cascade and forming part of said coupling means, whereby the attenuation produced by said two attenuators is the product of their separate attenuations, separate control means for each said attenuator for varying the attenuation thereof to simulate different characteristics of a radar antenna, and means independent from each other for driving each of said control means.

2. A radar simulator comprising signal generating means, at least one display device, means coupling said generating means to said display device, two signal attenuators coupled in cascade and forming part of said coupling means, whereby the attenuation produced by said two attenuators is the product of their separate attenuations, separate control means for each said attenuator for varying the attenuation thereof to simulate different characteristics of a radar antenna, and a separate electric motor driving each of said control means.

3. A radar simulator comprising signal generating means, at least one display device, means coupling said generating means to said display device, two signal attenuators coupled in cascade and forming part of said coupling means, each said attenuator comprising an input electrode, an output electrode, and a conducting sheet movable between said electrodes and pierced with at least one hole, and driving means for moving each said sheet between said electrodes to sweep said hole over the space between said electrodes.

4. A radar simulator according to claim 3, wherein each said sheet is rotatably mounted and is rotated by said driving means.

5. A radar simulator according to claim 3, wherein each said sheet is pierced with a row of holes and said driving means sweep the row of holes through the space between said electrodes.

6. A radar simulator according to claim 4, comprising means for rotating said sheet at a speed which is $n$ times the speed of rotation of the aerial to be simulated, and switching means rendering said coupling means operative only during one revolution of said sheet in every $n$ revolutions thereof.

7. A radar simulator for simulating passive jamming comprising pulse generating means, at least one display device, means coupling said generating means to said display device, a signal attenuator forming part of said coupling means, said attenuator comprising an input electrode, an output electrode, and a conducting element movable between said electrodes, said element having a hole pierced therethrough, driving means for moving said element between said electrodes to sweep said hole through the space between said electrodes, and means for varying the size of said hole.

8. A radar simulator according to claim 7, wherein said element comprises two superimposed sheets each pierced with a hole, means being provided to move one of said sheets relatively to the other to vary the overlap between the holes.

9. A radar simulator according to claim 8, wherein said element is rotatable and said driving means rotates said element, and wherein means are provided to rotate one of said sheets relatively to the other to vary the overlap between the holes.

10. A radar simulator comprising a signal generating means, at least one display device, means coupling said generating means to said display device, two signal attenuators coupled in cascade and forming part of said coupling means, a second signal generating means to simulate passive jamming coupled to the input of one of said attenuators, separate control means for each of said attenuators for independently varying the attenuation thereof to simulate different characteristics of a radar antenna and separate means for respectively driving each of said control means.

11. A radar simulator according to claim 10 comprising a further attenuator coupled between said second signal generating means and said input, further control means for said further attenuator for varying the attenuation thereof, and means driving said further control means to simulate progressive change in the passive jamming.

References Cited in the file of this patent

UNITED STATES PATENTS 2,751,689    Jones et al.    June 26, 1956